(No Model.)

E. W. ABBE.
BOTTLE STOPPER.

No. 423,978. Patented Mar. 25, 1890.

Witnesses.
John Edwards Jr.
E. V. Tracy.

Inventor.
Edwin W. Abbe
By James Shepard
Atty.

UNITED STATES PATENT OFFICE.

EDWIN W. ABBE, OF NEW BRITAIN, CONNECTICUT.

BOTTLE-STOPPER.

SPECIFICATION forming part of Letters Patent No. 423,978, dated March 25, 1890.

Application filed October 17, 1889. Serial No. 327,346. (No model.)

*To all whom it may concern:*

Be it known that I, EDWIN W. ABBE, a citizen of the United States, residing at New Britain, in the county of Hartford and State of Connecticut, have invented certain new and useful Improvements in Bottle-Stoppers, of which the following is a specification.

My invention relates to improvements in bottle-stoppers of the class having an elastic block and devices for expanding said block within the neck of the bottle; and the main object of my invention is to provide better means for adjusting the expansion for use in different bottles and to bring the adjusting devices outside of the bottle.

Figure 1:
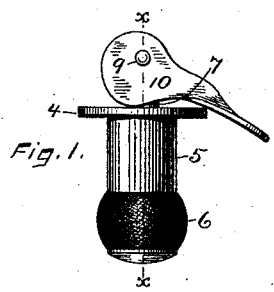
Figure 2:
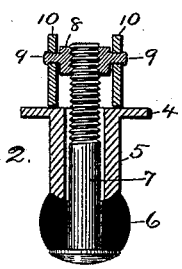
Figure 3:
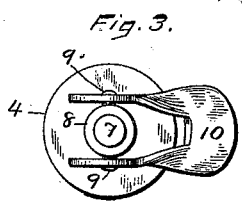

In the accompanying drawings, Figure 1 is a side elevation of my stopper. Fig. 2 is a vertical section thereof on line $x$ $x$ of Fig. 1, the central member being shown in side elevation, and Fig. 3 is a plan view of the same.

4 designates the flange for resting upon the mouth of the bottle; 5, the pressure-block, having a conical lower end. The flange 4 and pressure-block 5 may be separately formed or integral, as desired.

6 is the expansible block of rubber, and 7 the headed and screw-threaded bolt with its threaded end and body extending upwardly through the parts 4, 5, and 6, as shown. These parts are all old and may be of any ordinary construction. It is also old to apply a nut to the upper threaded end of the bolt when said nut rests directly upon the flange 4.

I place a nut 8 on the upper end of the bolt 7 and provide said nut in the preferred form with two trunnions 9 9, said nut being of a diameter considerably less than that of the flange 4. Upon these trunnions I place a bifurcated or double cam-lever 10, the edges of which bear upon the top of the flange 4 at each side of the nut 9, as shown. It is of course evident that the trunnions may be formed separately from the nut instead of integral therewith and any ordinary means for pivoting the cam-lever to the nut may be substituted for said integral trunnions.

Prior to my invention expansible bottle-stoppers have been provided with cam-levers when pivoted directly to the upper end of a bolt or central rod and adjusted for expanding more or less by a nut at the inner end of said bolt or central rod, and the same is hereby disclaimed.

By depressing the lever 10 from its most elevated position to that shown the pressure-block 5 will be forced a given distance upon the expansible block 6 to expand it. If the expansion thus caused is too little, the lever and nut may be rotated together to screw the nut farther on the bolt, and if too much the nut may be unscrewed, thereby enabling the stopper to be properly adjusted to different bottles. The nut being outside, the adjustment is apparent to the user at sight, and, furthermore, it is not liable to be corroded by the contents of the bottle, so as to make it stick. It can be easily turned, as there is no pressure upon it when being adjusted.

I am aware that an English patent prior to my invention shows a cask or vessel having a screw-threaded orifice and surrounding washer-seat, an elastic washer to fit said seat, a plug or stopper screw-threaded on its periphery to fit said orifice and having a bolt with its head end firmly embedded in said plug and its threaded end projecting on the top of said plug, a metal plate covering the end of said plug and washer, a nut on the outer end of said bolt, and a double cam-lever pivoted by trunnions on the sides of said nut and bearing upon said plate, and the same is hereby disclaimed.

I claim as my invention—

The herein-described bottle-stopper, consisting of the pressure-block 5, the headed expanding bolt 7, threaded at its outer end, the nut 8, fitted to said threaded end, the cam-lever 10, pivoted to said nut, and the expansible block 6 between the head of said bolt and end of said pressure-block, substantially as described, and for the purpose specified.

EDWIN W. ABBE.

Witnesses:
JAMES SHEPARD,
JOHN EDWARDS, Jr.